United States Patent [19]

King

[11] Patent Number: 5,355,243
[45] Date of Patent: Oct. 11, 1994

[54] DIRECT DETECTING OF OPTICAL PSK SIGNALS

[75] Inventor: Jonathan P. King, Epping, United Kingdom

[73] Assignee: Northern Telecon Limited, United Kingdom

[21] Appl. No.: 928,868

[22] Filed: Aug. 11, 1992

[30] Foreign Application Priority Data

Sep. 6, 1991 [GB] United Kingdom ............... 9119073

[51] Int. Cl.⁵ ........................................... H04B 10/06
[52] U.S. Cl. ................................. 359/190; 359/189
[58] Field of Search ............... 359/190, 156, 183, 189, 359/187, 193; 375/67, 83, 87, 93, 96

[56] References Cited

U.S. PATENT DOCUMENTS 5,148,128  9/1992  Mazumder ........................... 375/67
5,181,136  1/1993  Kavehrad et al. ................... 359/190

OTHER PUBLICATIONS

DeKrom, 'Impct of Laser Phase Noise on the Performance of a {3×3} Phase and Polarization Diversity Optical Homodyne DPSK receiver', Journal of Lightwave Technology vol. 8 No. 11 Nov. 1990, 1709–1715.

Neelakanta et al. 'Light-Emitting Diode as Radio-Frequency Detector: Development of RFI-Free Electromagnetic Field Sensor' Electronics Letters, Nov. 9, 1989 vol. 25 No. 23, 1606–1608.

*Primary Examiner*—Douglas W. Olms
*Assistant Examiner*—Shick Hom
*Attorney, Agent, or Firm*—Lee, Mann, Smith, McWilliams, Sweeney & Ohlson

[57] ABSTRACT

A self homodyne direct detection optical transmission system includes a transmitter in which binary data signals are converted into double differential phase shift keyed (DDPSK) optical signals. The receiver includes a two-path optical interferometer, having a path unbalance optical delay substantially equal to 1 bit period, to which received DDPSK signals are applied. The interferometer output is converted into a plurality of balanced phase diversity outputs. From each of the phase diversity outputs a replica of the binary data signals is recovered and the replica signals are combined to form an output binary data signal.

1 Claim, 4 Drawing Sheets

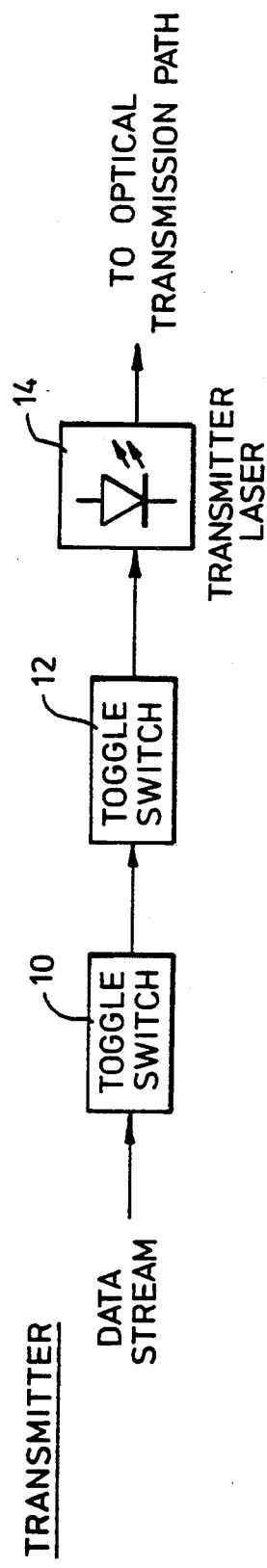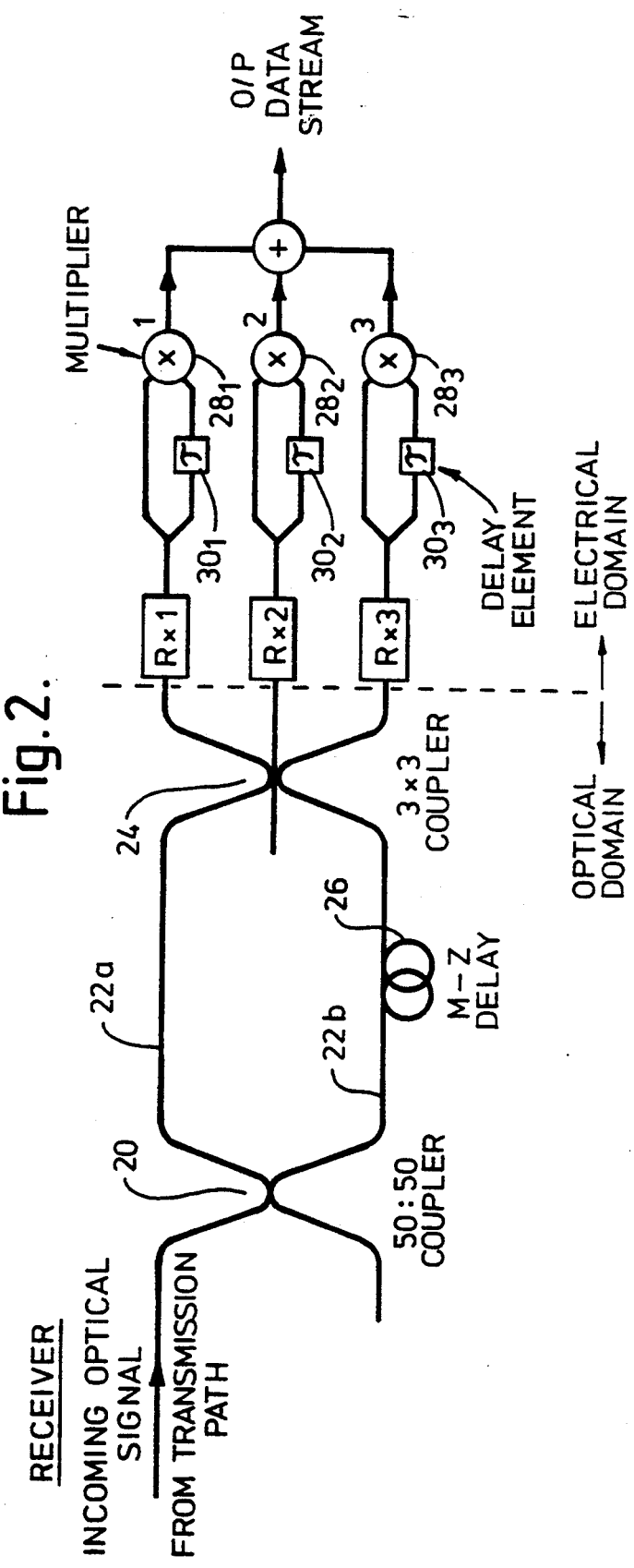

5,355,243

DIRECT DETECTING OF OPTICAL PSK SIGNALS

FIELD OF THE INVENTION

This invention relates to direct detection of optical phase shift keyed (PSK) signals in transmission systems.

DESCRIPTION OF RELATED ART

Frequency shift keying (FSK) and amplitude shift keying of semiconductor lasers are known for digital optical communication systems, especially where the transmission medium is optical fibre. Another form of semiconductor laser modulation is differential phase shift keying (DPSK), in which direct modulation of the laser drive current is effected using a differentially encoded modulation signal. All the above forms of keying are discussed in 'performance of Directly Modulated DFB Lasers in 10-Gb/s ASK, FSK and DPSK Lightwave Systems', Richard S. Vodhanel et al, Journal of Lightwave Technology, Vol. 8, No. 9, Sep. 1990, pp 1379–1386. As stated therein, DPSK is a suitable optical signal format for direct detection systems by including an optical modulator at the receiver.

Known optical homodyne direct detection transmission systems require either a phase locked optical discriminator in the receiver or absolute frequency control of the transmitter laser. The present invention seeks to provide an optical self homodyne direct detection transmission system which does not need these requirements.

SUMMARY OF THE INVENTION

According to the invention there is provided a self homodyne direct detection optical transmission system including at a transmitter means for converting binary data signals into double differentiated phase shift keyed (DDPSK) optical signals, as hereinafter defined, and at a receiver a two-path optical interferometer having a path unbalance optical delay substantially equal to 1 bit period to which received DDPSK signals are applied, means for converting the interferometer output into a plurality of balanced phase diversity outputs, means for recovering from each of the phase diversity outputs a replica of the binary data signals and means for combining the replica signals to form an output binary data signal.

The present invention utilises a signal format herein referred to as "double differential phase shift keying" (DDPSK). DDPSK defines signal encoding arrangements in which binary data is initially differentiated, e.g. by clocking with synchronous square waveform having a predetermined phase shift relative to the binary data, e.g. 90° out of phase therewith, followed by a second differentiation, e.g. by clocking the initially differentiated signal with a second synchronous waveform having a second predetermined phase shift relative to the first synchronous square waveform, e.g. 90° out of phase therewith.

BRIEF DESCRIPTION OF THE DRAWINGS

Embodiments of the invention will now be described with reference to the accompanying drawings, in which:

FIG. 1 is a schematic diagram of an optical transmitter arrangement for producing DDPSK signals;

FIG. 2 is a schematic diagram of a self homodyne direct detection optical receiver for D DPSK signals;

FIGS. 4, 4a is a schematic diagram of an alternative receiver arrangement, and

DESCRIPTION OF THE PREFERRED EMBODIMENTS

Figure 3:
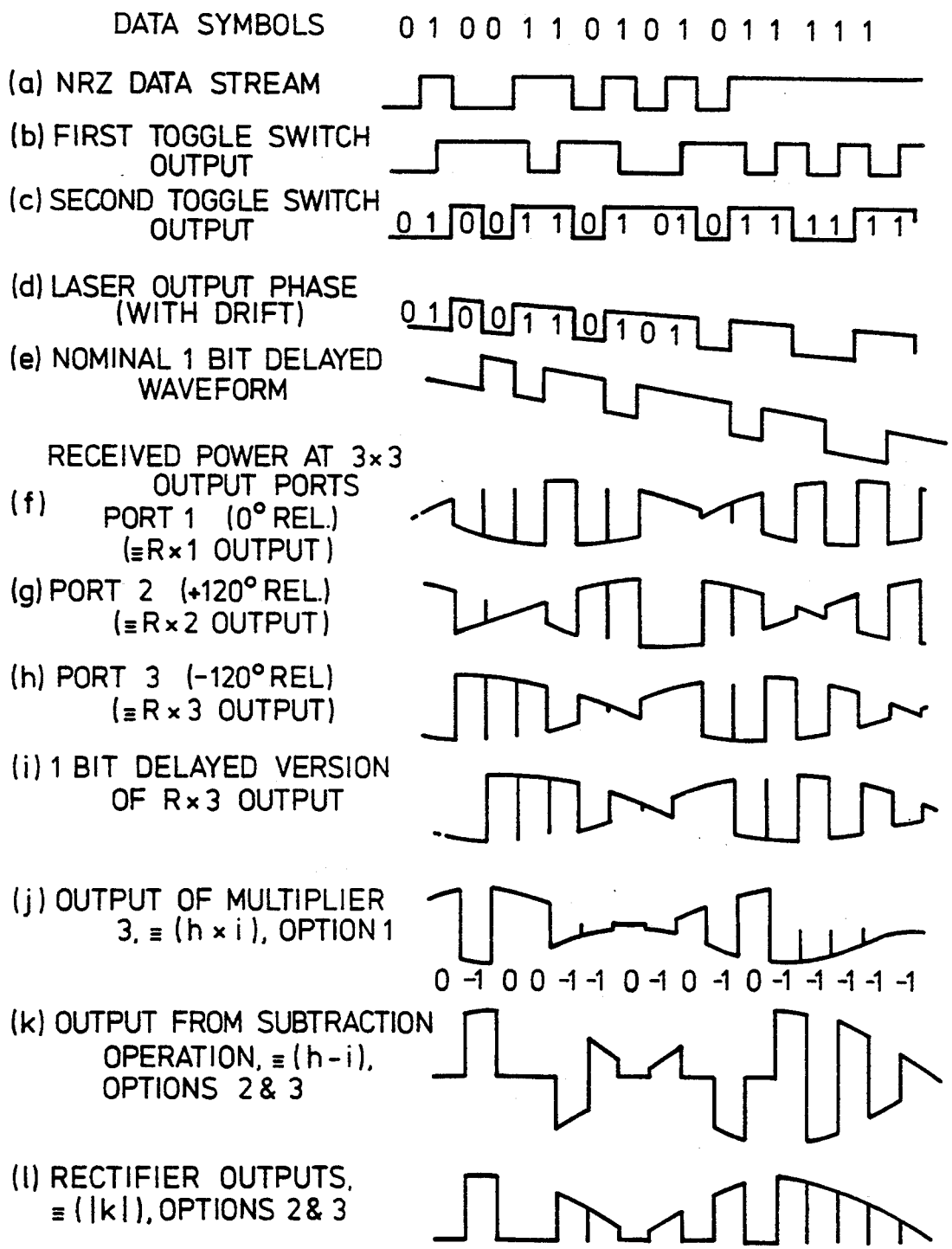
FIG. 3 illustrates various waveforms associated with an optical DDPSK self homodyne direct detection system.

In the transmitter arrangement of FIG. 1 a conventional non-return-to-zero (NRZ) binary data signal (waveform 'a' in FIG. 3) is applied to a first toggle switch 10 which is toggled by a square wave clock running at the data bit rate but having a nominal 90° phase shift relative to the NRZ data bit stream. The output of the first toggle switch 10 is a differentiated square waveform ('b' in FIG. 3) in which binary data of one value, e.g. '1', is represented by a change from either one of the two logic levels to the other while the other binary data value, i.e. '0', is represented by an absence of change in the then existing logic level. Thus binary '1's are represented by a step change at the midpoint of a NRZ bit period while '0's are represented by a constant logic level throughout the bit period. The output of toggle switch 10 is applied to a second similar toggle switch 12 which is likewise toggled by a second square waveform clock at the bit rate but synchronous with the NRZ binary bit stream, i.e. having a 90° phase shift relative to the first clock waveform. The resultant double toggled data stream ('c' in FIG. 3) output of toggle switch 12 is used to control modulation of the drive current for laser 14. As explained earlier, phase modulation of the semiconductor laser is effected by operating the laser with a substantially constant drive current, such that the laser is maintained constantly above its lasing threshold, and then imposing short drive pulses which briefly change the instantaneous optical frequency, thus producing a change in the optical phase of $\pi$ radians. A bipolar drive signal having pulses of 50 ps duration briefly change the laser's instantaneous optical frequency, thus producing either a $+\pi$ or $-\pi$ phase change, as appropriate at the data transitions. Waveform 'd' in FIG. 3 shows how changes in the laser output optical phase form the modulated optical signals. Note that there is no obvious correlation at this stage between the modulation of the laser optical phase and the original binary data NRZ bit stream. Note also that waveform 'd' shows a downward drift in the laser frequency due to drift in the laser.

At the receiver, FIG. 2, the incoming DDPSK optical signal is received from the transmission path, e.g. an optical fibre, and applied initially to an optical path-unbalanced phase-diversity Mach-Zehnder interferometer used as an optical phase discriminator, Essentially the interferometer comprises an input 2×2 optical fibre coupler 20 the two outputs of which are optical fibre links 22a, 22b to a second optical fibre coupler 24. One of the fibre links 22b includes an extra length of fibre 26 which provides an optical delay equal to 1-bit delay so that at coupler 24 the undelayed incoming signal over link 22a is interfered with the 1-bit delayed version of itself (waveform 'e'), so that the phase shift is converted to an amplitude change at each of the outputs of the second coupler 24.

The second coupler 24 in each of the embodiments described herein is a 3×3 optical coupler to provide a phase diversity function. The 3×3 coupler recombines the two interferometer paths to form three otherwise identical outputs having respectively 0, +120 and −120 degree relative phase shifts between the two paths. This is a characteristic feature of a 3×3 optical fibre coupler. Other components could be used to give, say 0° and 90° (or some other values of) relative phase shifts. The 0°, +120° and −120° values are convenient in that they will always provide balanced outputs. Consequently, if transmitter laser frequency drift (or phase drift in the Mach-Zehnder path imbalance) occurs, causing the optical discriminator output waveform amplitude to fade on one of the three output parts, the amplitudes on the other parts will increase to compensate (waveforms 'f', 'g' and 'h' in FIG. 3), so that the sum total amplitude remains constant for any given binary data bit after the three outputs are separately processed to recover the original data stream. These three optical coupler outputs are faded and/or inverted versions of waveform 'b', i.e. the original data once toggled. The second toggling operation allows these fading and/or inversion effects in the optical discriminator to be overcome by an appropriate post detection processing arrangement. The absolute frequency of the laser is not critical because it is the relative phase difference between adjacent bits which carries the information. The constraints on laser frequency drift and linewidth are similar to those for coherent DPSK; the phase change during a bit period due to these must be small.

In the arrangement shown in FIG. 2 the transmitted data stream is recovered as follows, after the outputs of coupler 24 have been translated from signals in the optical domain to electrical signals by applying them to respective optoelectric receivers $R_{x1}$, $R_{x2}$ and $R_{x3}$. The receiver outputs electrical equivalents of waveforms 'f', 'g' and 'h' are each fed to one input of a respective multiplier $28_1$, $28_2$ and $28_3$, and via delays $30_1$, $30_2$ and $30_3$ to the second input of the respective multiplier. The delays are nominally of 1-bit duration (or less if a form of 'return-to-zero' data stream us to be reconstructed). The delayed version of the output of receiver $R_{x3}$ is shown as waveform 'i' in FIG. 2. The resultant waveform 'j' is the output of multiplier $28_3$. It can be seen that although the data amplitude on waveform 'j' still fades, the data always has the same polarity, i.e. an input data '1' (see waveform 'a') always corresponds to a negative going pulse from the multiplier output. Similar waveforms are produced from the other two multipliers. However, the data fading from each multiplier is always 120° out of phase with the fading on the other two multipliers but, since the data on all three outputs has the same polarity, simple summing of the three outputs reconstructs the data stream with substantially constant amplitude, albeit inverted with respect to the original input.

Figure 4:
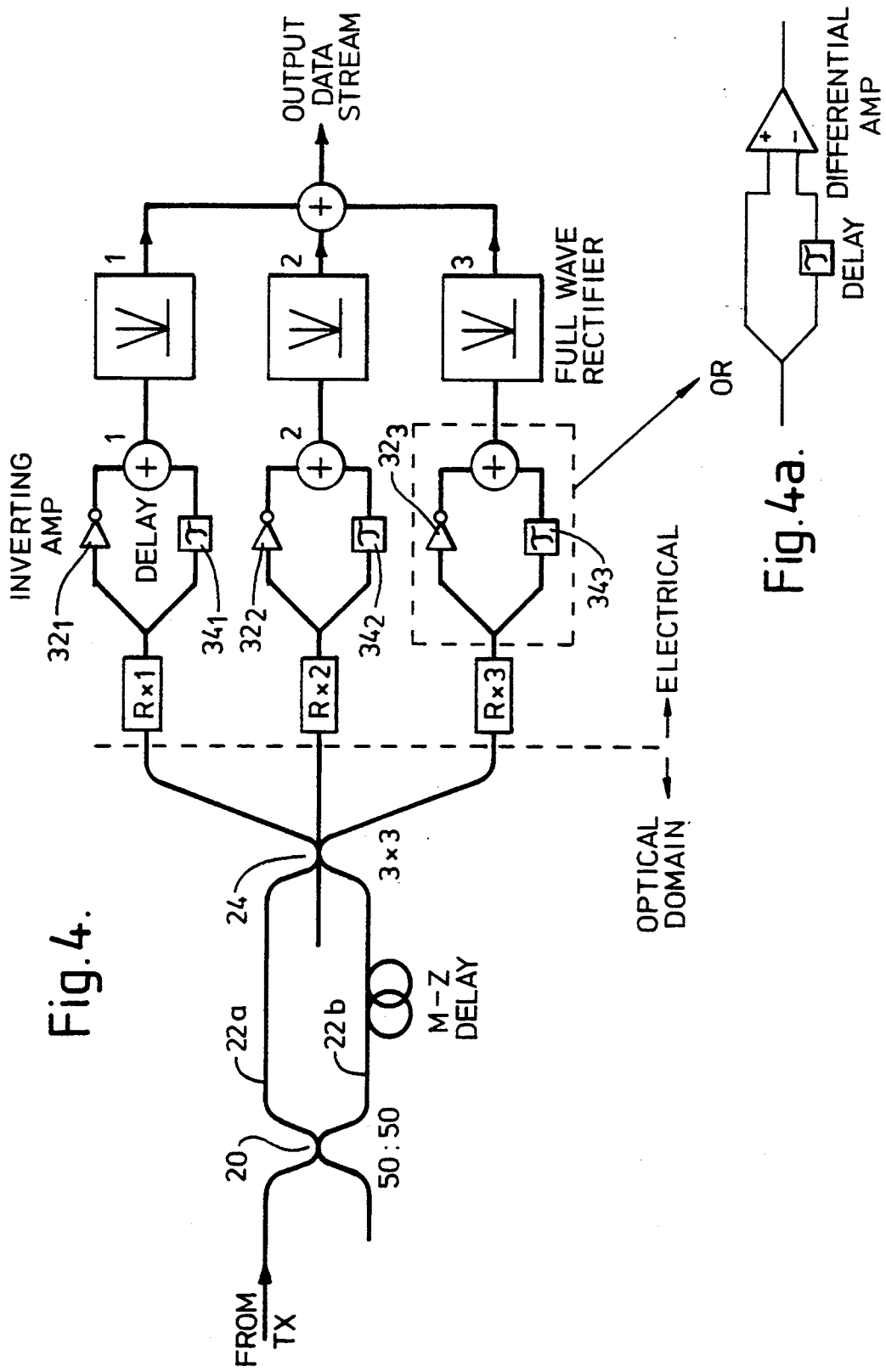

In the alternative arrangement shown in FIG. 4, the interferometer incorporating the 3×3 coupler feeding three receivers $R_{x1}$-$R_{x3}$ is the same as in FIG. 2. In this case each receiver output is subtracted from a nominal 1-bit delayed version of itself. At high data rates subtracting or differencing of electrical signals may be preferable to multiplying. This may be performed by dividing the receiver output into two paths, one of which incorporates an inverter $32_1$-$32_3$ while the other path incorporates a delay $34_1$-$34_3$, and then summing the signals. Alternatively, the inversion and delay can be in the same path, the normal receiver output being summed with the delayed and inverted version of itself. As a further alternative the normal undelayed signal and the delayed (but non-inverted) version can be applied to two inputs of a differential amplifier, as shown in FIG. 4a. This process will produce data '0's as a centre or zero logic level while data '1's will be either positive or negative pulses whose amplitude is dependent on the degree of waveform fading (waveform 'k' in FIG. 2). Finally, the original data stream is reconstructed by rectifying each signal ('1' in FIG. 2) and summing the three rectified waveforms.

Figure 5:
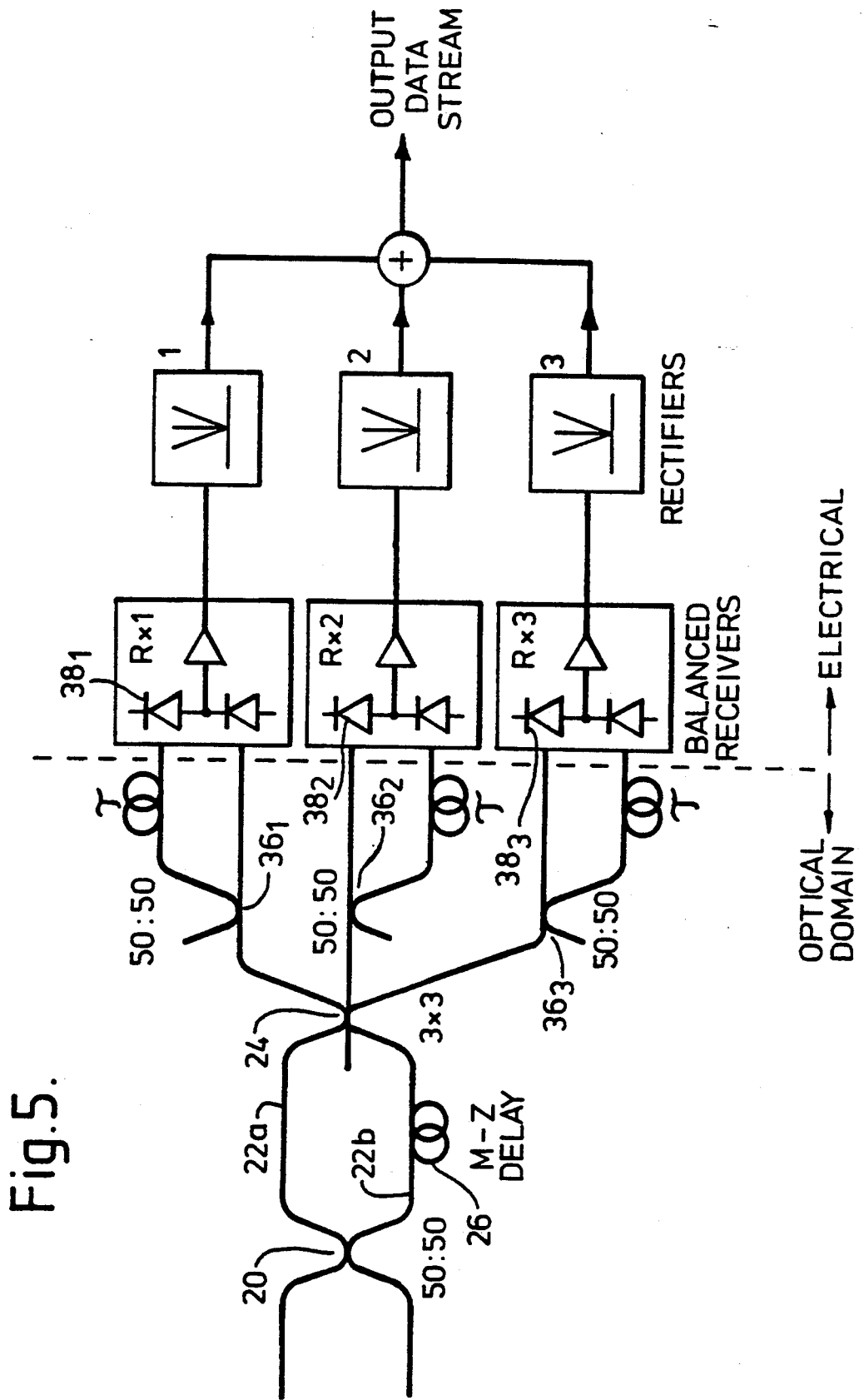
FIG. 5 is a schematic diagram of a further alternative receiver arrangement.

In the arrangement shown in FIG. 5 the same principles of delay and subtract as used in the arrangement of FIG. 4 are employed, however the delay operation is now performed in the optical domain instead of in the electrical domain. This simplifies the electronics at the expense of additional optical components. The three optical discriminator outputs of coupler 24 are each fed to a respective nominally 50:50 ratio coupler $36_1$-$36_3$. The two outputs of each coupler are directed onto respective balanced optoelectric receivers, $38_1$-$38_3$. In this case the nominal 1-bit delay is provided by making the output paths of each 50:50 coupler differ in length by an amount equal to the nominal bit period delay (or less if required). The outputs from each receiver are then separately rectified (or squared) and summed to reconstruct the original input data. Again waveforms 'k' and 'l' represent the output from the subtraction operation and the rectified signal respectively.

I claim:

1. A self homodyne direct detection optical transmission system including at a transmitter means for converting binary data signals into double differentiated phase shift keyed optical signals, and at a receiver a 2×2 optical coupler to one input of which are applied the received double differentiated phase shift keyed optical signals, a 3×3 optical coupler two inputs of which are coupled to respective outputs of the 2×2 coupler to form a two-path optical interferometer, one of the paths including an optical delay substantially equal to 1 bit period, whereby the output of the 3×3 coupler forms 3 balanced phase diversity signals, separate means for recovering from each of the phase diversity signals a replica of the binary data signals, and means for combining the replica signals to form an output binary data signal.

* * * * *